(12) United States Patent
Marando

(10) Patent No.: US 6,497,030 B1
(45) Date of Patent: Dec. 24, 2002

(54) METHOD OF MANUFACTURING A LEAD SCREW AND SLEEVE MECHANISM USING A HYDROFORMING PROCESS

(75) Inventor: Richard A. Marando, Mohrsville, PA (US)

(73) Assignee: Dana Corporation, Toledo, OH (US)

( * ) Notice: Subject to any disclaimer, the term of this patent is extended or adjusted under 35 U.S.C. 154(b) by 25 days.

(21) Appl. No.: 09/650,955

(22) Filed: Aug. 29, 2000

Related U.S. Application Data

(60) Provisional application No. 60/151,780, filed on Aug. 31, 1999.

(51) Int. Cl.[7] .................................................. B23P 17/00
(52) U.S. Cl. ........................ 29/421.1; 29/419.2; 29/523; 72/56; 72/61
(58) Field of Search ............................. 29/419.2, 421.1, 29/424, 437, 515, 516, 523, 423; 72/54, 56, 57, 58, 61

(56) References Cited

U.S. PATENT DOCUMENTS

| | | |
|---|---|---|
| 2,014,972 A | 9/1935 | Lacey |
| 2,050,227 A | 8/1936 | Mantle |
| 2,833,330 A | 5/1958 | Love |
| 3,168,399 A * | 2/1965 | Takahashi et al. ............ 29/423 |
| 3,247,581 A | 4/1966 | Pellizzari |
| 3,299,417 A * | 1/1967 | Sibthorpe .................... 29/423 |
| 3,308,908 A * | 3/1967 | Bunn .......................... 29/516 |
| 3,943,619 A * | 3/1976 | Hendrickson ................. 29/424 |
| 4,055,929 A | 11/1977 | Stancati et al. |
| 4,359,812 A * | 11/1982 | Haag et al. ................... 29/458 |
| 4,724,694 A * | 2/1988 | Medal .......................... 72/88 |
| 5,022,135 A * | 6/1991 | Miller et al. ............... 29/421.1 |
| 5,293,679 A * | 3/1994 | Hsu ............................ 29/523 |
| 5,457,977 A * | 10/1995 | Wilson ......................... 72/56 |
| 5,813,264 A * | 9/1998 | Steingroever .................. 72/56 |
| 5,826,320 A * | 10/1998 | Rathke et al. ............. 29/419.2 |
| 6,081,982 A * | 7/2000 | Schulz ....................... 29/421.1 |

\* cited by examiner

*Primary Examiner*—Gregory M. Vidovich
*Assistant Examiner*—Jermie E. Cozart
(74) *Attorney, Agent, or Firm*—MacMillan, Sobanski & Todd, LLC

(57) ABSTRACT

A method of manufacturing a sleeve mechanism without the use of machines by using a hydroforming process. The method includes the steps of providing an inner sleeve, an intermediate sleeve, and an outer sleeve concentrically within one another. The concentric sleeves are then expanded by using a hydroforming process such that an external thread is formed on the inner sleeve and an internal thread is formed on the outer sleeve. After the hydroforming process, the intermediate sleeve is removed by using any desired manner, such as melting or chemical dissolution. The relatively small space remaining between the inner and outer sleeves allow them to freely rotate about each other to ensure smooth operation of the screw and sleeve mechanism. Alternatively, the inner and outer sleeves may be hydroformed in separate operations.

6 Claims, 3 Drawing Sheets

METHOD OF MANUFACTURING A LEAD SCREW AND SLEEVE MECHANISM USING A HYDROFORMING PROCESS

CROSS REFERENCE TO RELATED APPLICATION

This application claims the benefit of United States Provisional Application Ser. No. 60/151,780, filed Aug. 31, 1999, the disclosure of which is incorporated herein by reference.

BACKGROUND OF THE INVENTION

This invention relates to a method of manufacturing a cooperating threaded lead screw and sleeve mechanism, such as for use in a linear actuator, using a hydroforming process.

A linear actuator is a well known device that is adapted to effect linear movement, typically reciprocating linear movement, of a workpiece along a desired path of movement. A typical linear actuator includes an electric motor having a rotatable output shaft that is connected through a gear train to a lead screw and nut mechanism. When the electric motor is actuated, rotation of the output shaft causes corresponding rotation of the lead screw. The lead screw is typically formed from an elongated shaft having an external helical thread provided on the outer surface thereof. The nut is typically formed from a block of material having an opening formed therethrough, with an internal helical thread formed on the inner surface thereof. The nut is mounted on the lead screw in such a manner as to be restrained from rotating with the lead screw when the electric motor is actuated. The helical threads of the lead screw and the nut cooperate with one another such that rotation of the lead screw causes linear movement of the nut axially along the lead screw. The direction of such axial movement of the nut (and of the workpiece connected thereto) is dependent upon the direction of rotation of the lead screw.

A variety of methods are known for forming lead screw and nut mechanisms of the general type described above. Typically, the lead screw and the nut are each formed from solid pieces of material to desired rough shapes, then machined to precise final desired shapes. Although known methods have been effective, it would be desirable to provide an improved method for manufacturing same.

SUMMARY OF THE INVENTION

This invention relates to a method of manufacturing a externally threaded screw and internally threaded sleeve mechanism without the use of machines by using a hydroforming process. Initially, an inner sleeve, an intermediate sleeve, and an outer sleeve are disposed concentrically within one another. The inner and outer sleeves are preferably formed from a rigid metallic material, while the intermediate sleeve may be formed from any desirable spacer material. The concentric sleeve assembly is then disposed within die halves of a hydroforming apparatus and hydraulically expanded such that an external thread is formed on the inner sleeve and an internal thread is formed on the outer sleeve. The intermediate sleeve is then removed in any desired manner, such as by melting or chemical dissolution. The relatively small space remaining between the inner and outer sleeves allow for relative rotation therebetween. Alternatively, the inner and outer sleeves can be hydroformed in separate operations for subsequent use.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
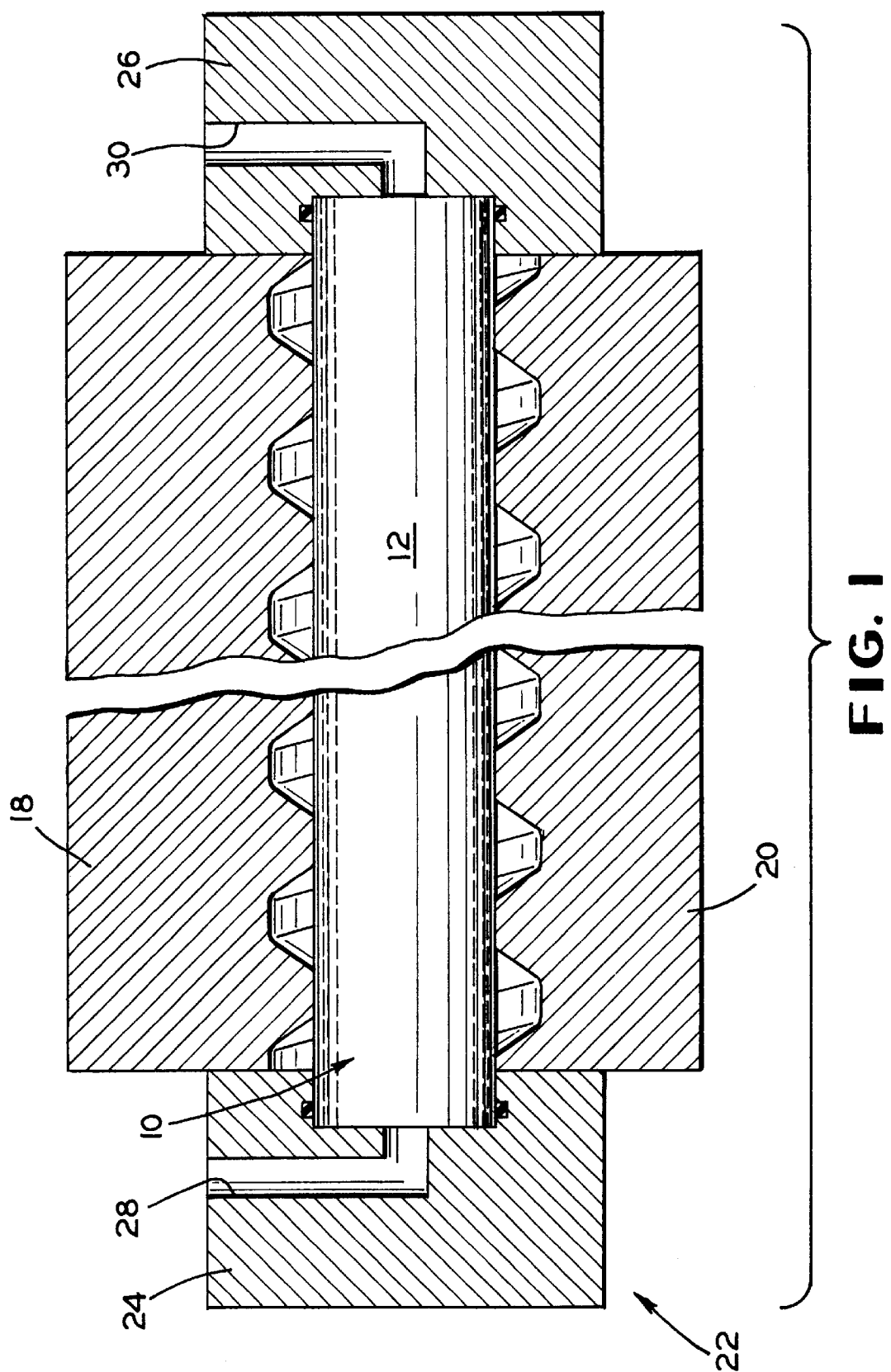
FIG. 1 is a sectional elevational view of an apparatus for manufacturing a lead screw and sleeve mechanism in accordance with this invention, wherein the workpiece is shown prior to the performance of a hydroforming operation.
Figure 2:
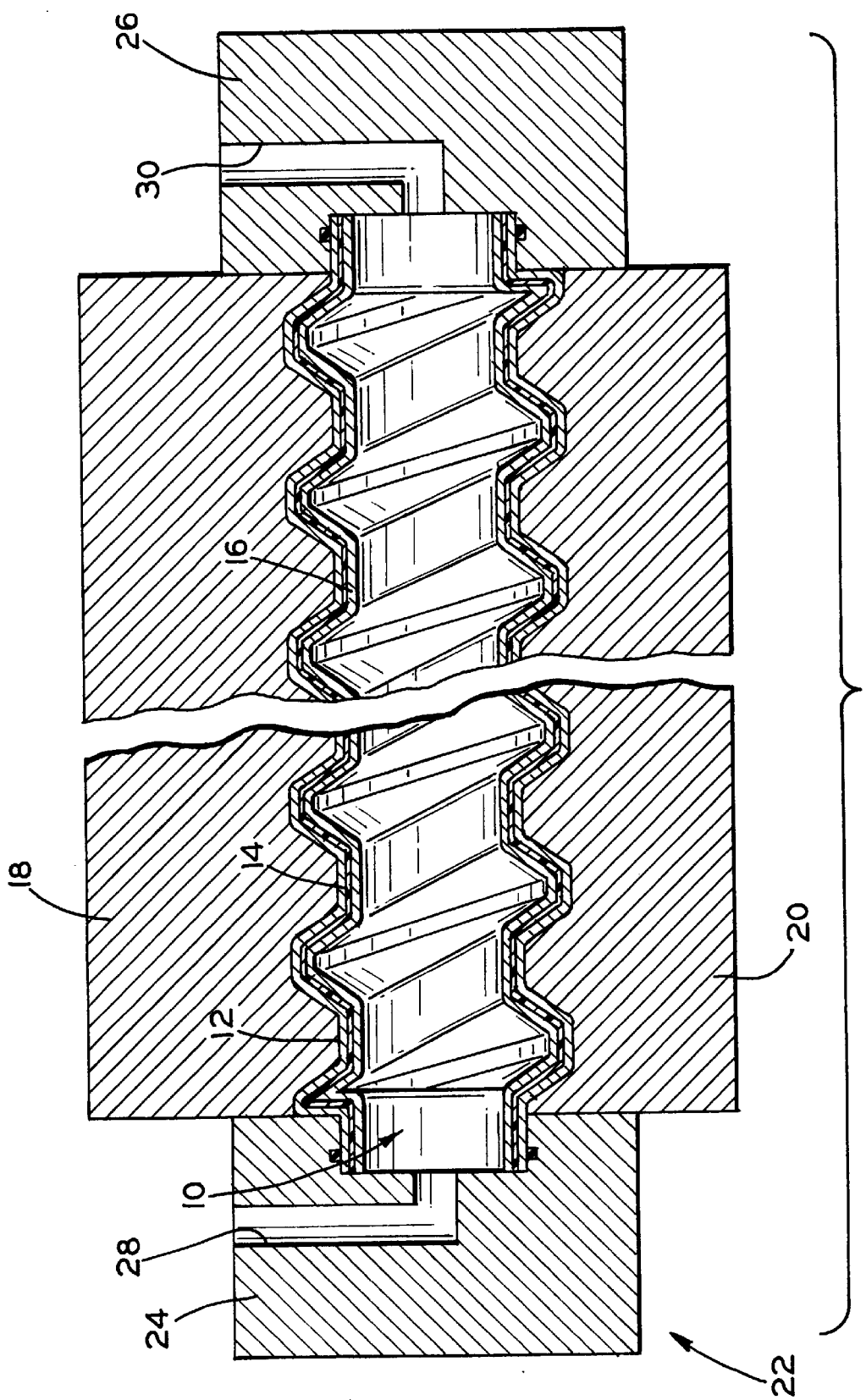
FIG. 2 is a sectional elevational view similar to FIG. 1, wherein the workpiece is shown after the performance of the hydroforming operation.

Referring now to the drawings, there is illustrated in FIGS. 1 and 2 a workpiece assembly, indicated generally at 10, that is adapted to be formed into a lead screw and sleeve mechanism in accordance with the method of this invention. The workpiece assembly 10 includes an outer sleeve or tubular member 12, an intermediate sleeve or tubular member 14, and an inner sleeve or tubular member 16. The outer and inner tubular members 12, 16 are preferably formed from a material that can be permanently deformed by a hydroforming process, such as metal and the like. The intermediate tubular member 14 is preferably formed from a material that can be deformed by the hydroforming process and subsequently removed from between the outer and inner tubular members 12 and 16, as described below. However, it will be appreciated that the invention is not intended to be limited by the types of material used for the outer tubular member 12, the intermediate tubular member 14, and the inner tubular member 16.

As shown in FIG. 2, the outer tubular member 12 preferably has an inner diameter that is slightly larger than the outer diameter of the intermediate member 14. Similarly, the intermediate tubular member 14 preferably has an inner diameter that is slightly larger than the outer diameter of the inner tubular member 16. Thus, the inner tubular member 16 can be disposed concentrically within the intermediate tubular member 14, and the intermediate tubular member 14 can be disposed concentrically within the outer tubular member 12 with relative ease. The concentrically disposed tubular members 12, 14, and 16 are then disposed between upper and lower die sections 18 and 20 of a hydroforming apparatus, indicated generally at 22. A typical hydroforming apparatus 22 includes a frame (not shown) supporting the die sections 18 and 20 thereon for relative movement between opened and closed positions. The die sections 18 and 20 have cooperating recesses formed therein that together define a die cavity having a shape corresponding to a desired final shape for the workpiece 10. When moved to the opened position, the die sections 18 and 20 are spaced apart from one another to allow workpiece 10 to be inserted within or removed from the die cavity. When moved to the closed position, the die sections 18 and 20 are disposed adjacent to one another so as to enclose the workpiece 10 within the die cavity. Although the die cavity is usually somewhat larger than the workpiece 10 to be hydroformed, movement of the two die sections 18 and 20 from the opened position to the closed position may, in some instances, cause some mechanical deformation of the workpiece 10. In any event, the workpiece 10 is then filled with a fluid, typically a relatively incompressible liquid such as water. The pressure of the fluid within the workpiece 10 is increased to such a magnitude that the workpiece 10 is expanded outwardly into conformance with the die cavity. As a result, the workpiece 10 is deformed or expanded into the desired final shape. Hydroforming is an advantageous process because it can quickly deform a workpiece into a desired complex shape.

In a typical hydroforming apparatus 22, the die sections 18 and 20 are arranged such that the upper die section 18 is supported on a ram of the apparatus 22, while the lower die section 20 is supported on a bed of the apparatus 22. A mechanical or hydraulic actuator is provided for raising the ram and the upper die section 18 upwardly to the opened position relative to the lower die section 20, allowing the previously deformed workpiece 10 to be removed from and a new workpiece to be inserted within the die cavity. The actuator also lowers the ram and the upper die section 18 downwardly to the closed position relative to the lower die section 20, allowing the hydroforming process to be performed. To maintain the die sections 18 and 20 together during the hydroforming process, a mechanical clamping device is usually provided. The mechanical clamping device mechanically engages the die sections 18 and 20 (or, alternatively, the ram and the base upon which the die sections 18 and 20 are supported) to prevent them from moving apart from one another during the hydroforming process. Such movement would obviously be undesirable because the shape of the die cavity would become distorted, resulting in unacceptable variations in the final shape of the workpiece 10. The die sections 18 and 20 form a die cavity preferably shaped to have a desired final shape of the tubular members 12, 14, and 16. In the preferred method, the die cavity is generally circular in shape, having a helical thread or other desired shape formed on the inner surface thereof. The length of the die cavity may be of any length to sufficiently form the screw and sleeve mechanism 10.

The hydroforming apparatus 22 further includes a pair of end feed cylinders 24 and 26 that are positioned at opposite ends of the die sections 18 and 20. The end feed cylinders 24 and 26 are conventional in the art and are adapted to sealingly engage the ends of at least the inner tubular member 16. The end feed cylinders 24 and 26 having respective passageways 28 and 30 formed therein that to fill the inner tubular member 16 with pressurized fluid, typically a relatively incompressible liquid such as water, from a source of pressurized fluid (not shown) in a manner well known in the art. The pressure of the fluid within the inner tubular member 16 is then increased to such a magnitude that the tubular members 12, 14 and 16 are all expanded outwardly into conformance with the die cavity defined by the die sections 18 and 20, as shown in FIG. 2. As a result, an external helical thread is formed on the inner tubular member 16 and a cooperating internal helical thread is formed on the outer tubular member 12.

After the hydroforming process is completed, the intermediate tubular member 14 is removed from between the outer tubular member 12 and the inner tubular member 16. The tubular members 12, 14, and 16 may remain within the die cavity or may be removed from the die cavity during the removal of the intermediate tubular member 14. Removal of the intermediate tubular member 14 can be accomplished using several different methods depending on the type of material used to form the intermediate tubular member 14. For example, if the intermediate tubular member 14 is formed from a plastic having a relatively low melting temperature, then the screw and sleeve mechanism 10 may be heated to a temperature sufficient to melt the intermediate tubular member 14, allowing it to drain in liquid form from between the outer tubular member 12 and the inner tubular member 16. Alternatively, the intermediate tubular member 14 may be formed from a material that can be readily dissolved using chemicals, such as a milar or plastic material.

Figure 3:
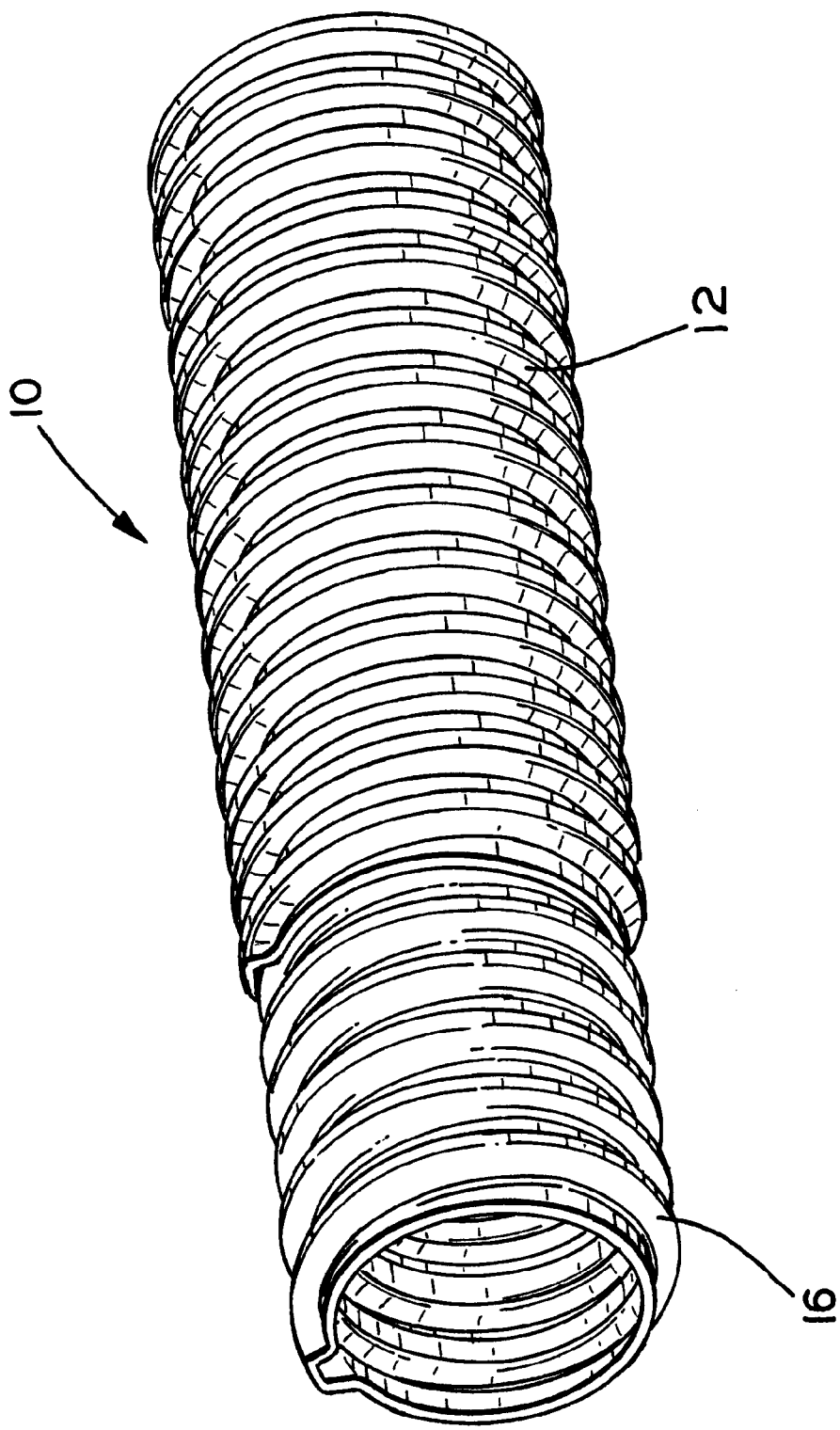
FIG. 3 is a perspective view of the lead screw and sleeve mechanism formed in accordance with the method of this invention.

Thus, it can be seen that the purpose of the intermediate tubular member 14 is to provide a gap between the outer and inner tubular members 12 and 16 during the initial forming process. Thereafter, the intermediate tubular member 14 is removed, allowing the outer and inner tubular member 12 and 16 to be freely rotatable relative to one another. FIG. 3 illustrates the lead screw and sleeve mechanism 10 after the intermediate sleeve 14 has been removed. The resultant outer and inner tubular members 12 and 16 are generally hollow and cylindrical in shape, but are corrugated to have respective helical threads formed therein. In the preferred method, the outer tubular member 12 and the inner tubular member 16 are hydroformed simultaneously within the same die cavity of the hydroforming apparatus 22. However, it should be understood that the outer tubular member 12 can be hydroformed separately from the intermediate tubular member 14 and the inner tubular member 16 if desired.

The formation of the outer and inner tubular members 12 and 16 has been described and illustrated in the context of the illustrated hydroforming apparatus 22. However, the method of this invention may be practiced using forming methods other than hydroforming. For example, the outer and inner tubular members 12 and 16 may be deformed using magnetic pulse forming techniques. To accomplish this, an internal magnetic pulse welding inductor assembly is inserted within the inner tubular member 16 and actuated to generate an intense electromagnetic field. The presence of this electromagnetic field causes the tubular members 12, 14 and 16 to be expanded outwardly into conformance with the die cavity defined by the die sections 18 and 20, as shown in FIG. 2. As a result, an external helical thread is formed on the inner tubular member 16 and a cooperating internal helical thread is formed on the outer tubular member 12. The intermediate tubular member 14 can then be removed in the same manner as described above. It should be understood that the outer tubular member 12 can be expanded separately from the intermediate tubular member 14 and the inner tubular member 16 if desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for manufacturing a lead screw and sleeve mechanism including first and second members that rotate relative to one another such that relative rotational movement causes relative axial movement, said method comprising the steps of:

(a) disposing an inner member, an intermediate member, and an outer member within one another;

(b) disposing the members within a die cavity including an inner surface having a helical thread recess formed therein;

(c) expanding the members into conformance with the die cavity such that an external helical thread is formed on the inner member and an internal helical thread is formed on the outer member; and (d) removing the intermediate member from between the inner and outer members to provide a space therebetween that allows the inner and outer members to rotate relative to one another such that relative rotational movement causes relative axial movement.

2. The method defined in claim 1 wherein said step (a) is performed by providing the inner member, the intermediate member, and the outer member as tubular members.

3. The method defined in claim 1 wherein said step (c) is performed by hydroforming.

4. The method defined in claim 1 wherein said step (c) is performed by magnetic pulse forming.

5. The method defined in claim 1 wherein said step (d) is performed by melting the intermediate member.

6. The method defined in claim 1 wherein said step (d) is performed by chemically dissolving the intermediate member.

* * * * *